July 29, 1924.
H. FORD
AUTOMOTIVE RAILWAY CAR
Original Filed May 13, 1921   2 Sheets-Sheet 1
1,503,454
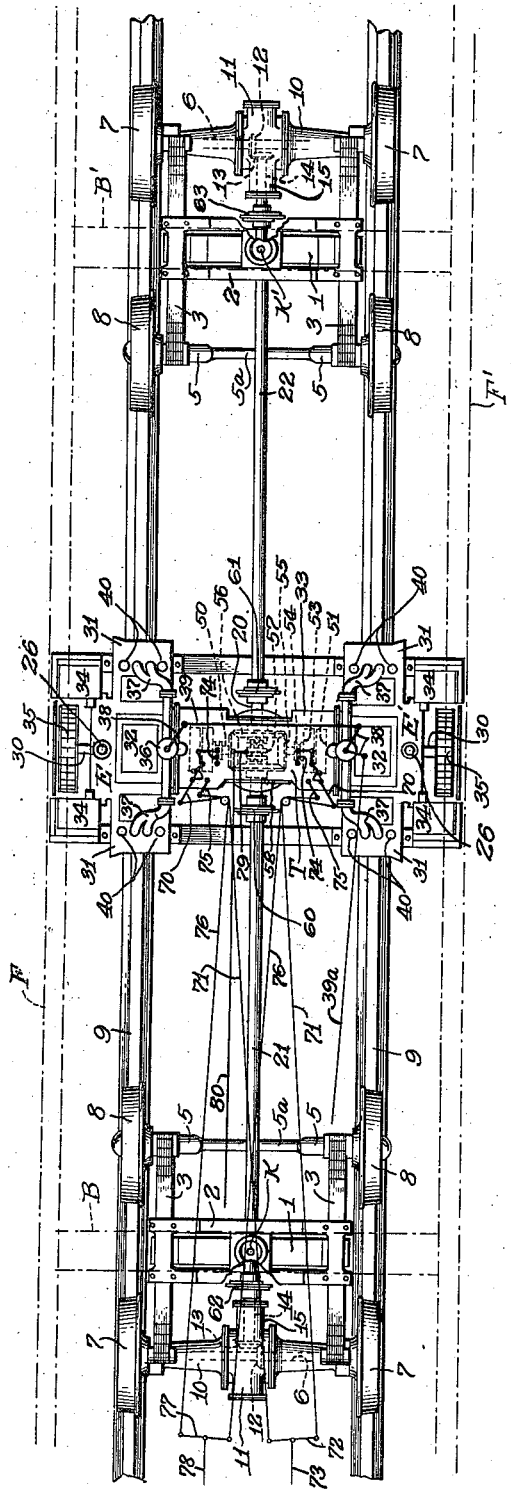
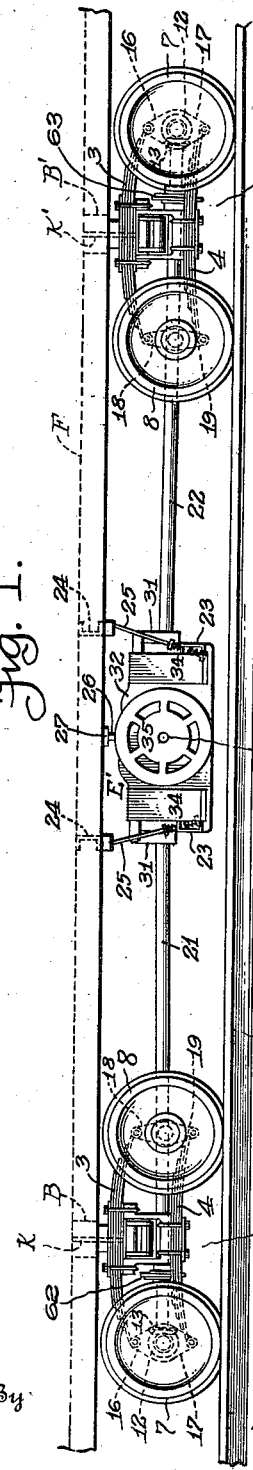
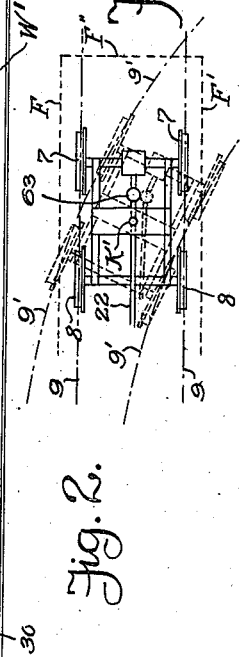
Inventor
Henry Ford,
By
Attorneys

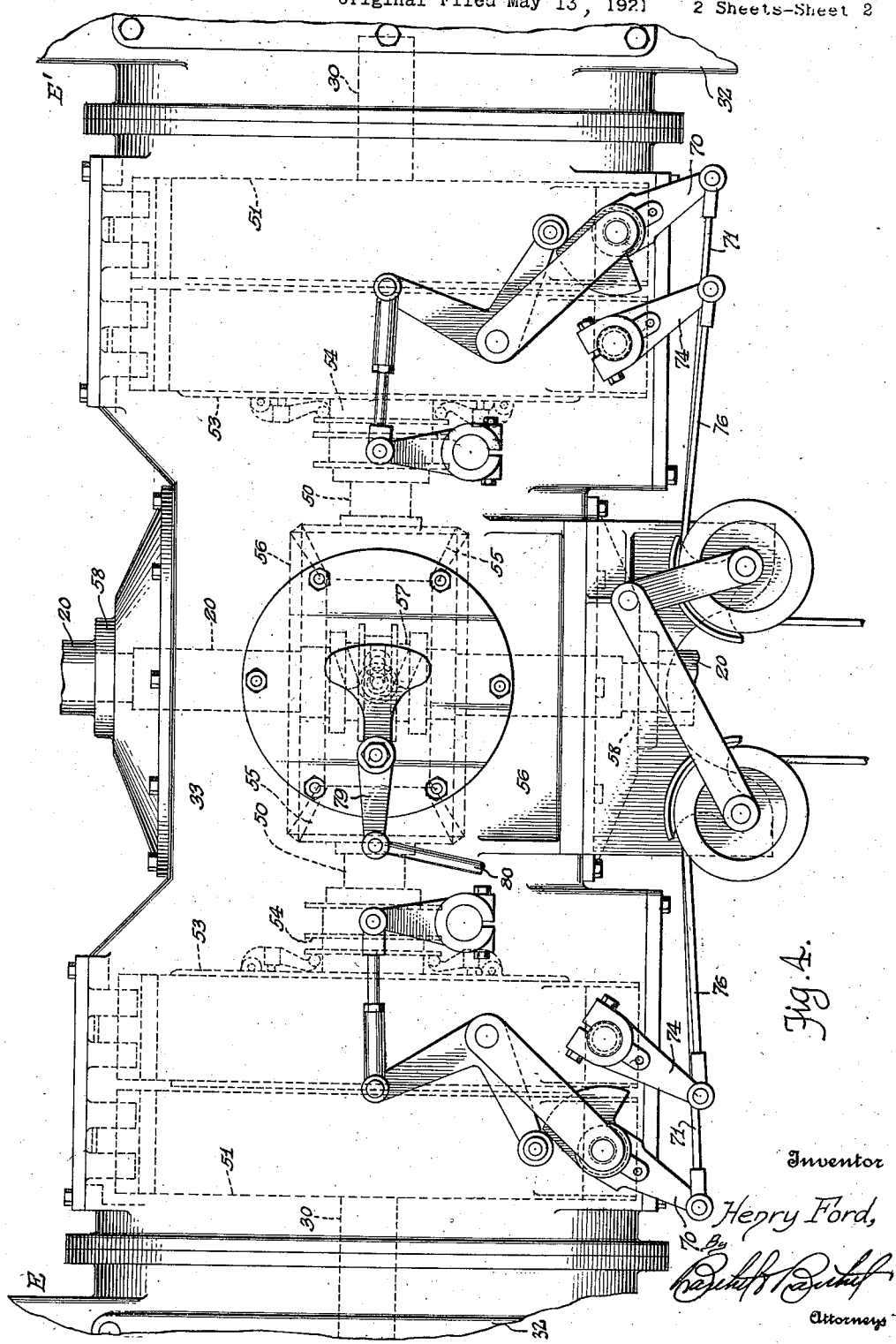

Patented July 29, 1924.

1,503,454

UNITED STATES PATENT OFFICE.

HENRY FORD, OF DEARBORN, MICHIGAN.

AUTOMOTIVE RAILWAY CAR.

Application filed May 13, 1921, Serial No. 469,146. Renewed June 30, 1924.

*To all whom it may concern:*

Be it known that I, HENRY FORD, a citizen of the United States of America, residing at Dearborn, in the county of Wayne and State of Michigan, have invented certain new and useful Improvements in Automotive Railway Cars, of which the following is a specification, reference being had therein to the accompanying drawings.

My invention relates to railway rolling stock and has for an object to provide a practical, versatile and efficient railway motor or automotive railway car.

To these and other ends, my invention may consist in a railway car such as that illustrated in the drawings, wherein:

Figure 1 is a schematic plan view of a railway car embodying my invention, shown standing upon a rail tramway;

Fig. 2 is a side elevation of Fig. 1;

Fig. 3 is a schematic plan view of part of the driving and running gear of the car illustrating the manner in which a track curve is negotiated; and Fig. 4 is an enlarged plan of a transmission housing forming part of the power plant of the railway car.

The car body or frame may be a practically rigid load carrying structure, having a pair of longitudinal sills or frame side members F and F' secured to and carried by a pair of cross members or bolsters B and B' suitably spaced with respect to the length of the car and each adapted to be mounted upon one of a pair of car or wheel trucks denoted generally by W and W' and to be pivotally connected to the king bolt or pivot K or K' of its respective truck.

The trucks, W and W' may be mutually similar as shown and since, for convenience, we may term the left end of the car as viewed in the drawings the head end and the opposite end its rear end, we may refer to the trucks W and W' as the front and rear truck respectively.

In each of these trucks the king pivot is mounted upon and secured to the intermediate portion of an upwardly bowed bolster spring 1 having a plurality of leaves and shackled or otherwise attached to and supported by a suspension frame 2 which in turn is supported by a set of plural leaf, upwardly bowed, laterally and longitudinally resilient truck side springs 3 and 4 clipped to and seated on the suspension frame and carried by the truck axles 5 and 6. These trucks are described in detail in a co-pending application, Serial No. 573,624, filed July 8, 1922, and are herein generally described in certain particulars only.

Each of the outer axles 6, that is, the truck axle adjacent each end of the car and remote from its transverse center line is a driving axle and carries a pair of load supporting driving or traction wheels 7 rigidly mounted thereon; whereas the inner axle 5 of each of the trucks is an inert axle and carries freely journaled at either end a load supporting freely rolling wheel 8. These wheels are adapted to track on the tram or railway rails 9.

The driving axle 6 of each of the trucks is preferably a continuous shaft rigidly attached to each of its wheels and journaled in a casing embodying a pair of axle tubes 10 and a bevel gear drive housing 11. Within this housing is contained a bevel gear drive including a bevel gear 12 rigidly mounted on the live axle 6 and having meshing therewith a bevel gear 13 rigidly mounted on the axle driving shaft 14 which is journaled in the extension 15 of the housing member of the axle casing.

At each of the wheel ends of this casing is rigidly mounted one of a pair of brackets embracing the axle tube having a pair of vertically extending arms 16 and 17 to each of which an eye of each of the truck springs 3 and 4 respectively is pivotally secured by a suitable spring eye bolt. Similarly at their other ends, the eyes of each of these truck springs are pivotally secured respectively, to one of a pair of vertically extending arms 18 and 19 formed on each of a pair of brackets embracing and rigidly secured to the axle 5 adjacent its wheels.

Thus the spring suspension of each of the trucks, in addition to carrying the frame and load structure of the car, resists the torque reactions of the axle drive and transmits the driving effort of the traction wheels to the car, thereby providing a cushioned drive.

The power plant, set forth in detail in co-pending application, Serial No. 526,539, filed Jan. 3, 1922, is preferably a twin unit engine driving through a common jack shaft 20 which in turn is flexibly connected to each of the axle driving shafts 14 by the fore and aft propeller shafts 21 and 22 respectively. In the particular form shown this power plant includes a pair of four cycle internal combustion engines E and E', each bolted to an end of a twin transmission T. A power plant unit is thus formed which is resiliently carried on a sub-frame suspended from the car frame or structure. The suspension means includes a pair of transverse sub-frame channels 23 upon which the power plant and its equipment is mounted and secured; a pair of car frame cross members 24 from which the sub-frame channels 23 are resiliently suspended by the four mutually converging suspension rods 25 which are flexibly secured to the cross members and have a cushioned connection with the channels 23; and a torque constrainment provided by a pair of stop pins 26 secured to a rigid portion of the power plant spaced apart in the direction of the sub-frame channels and each entering a socket 27 secured with respect to the car frame.

Each of the engines E and E', embodies generally, an engine shaft 30 driven by four cylinders arranged in two opposed pairs siamesed in the cylinder blocks 31 rigid with a crank case 32 which is secured to an end of the transmission case 33. The cylinders are adapted to be cooled by a water cooling system including the radiators 34 supplied with an air draft by the sirocco blowers 35 mounted on the outer end of each of the engine shafts. A pair of liquid fuel carbureters 36 supply the engine cylinder charges through the manifolds 37 and the throttle valve levers 38 are linked together as indicated by 39 and simultaneously operated by a single control system indicated by 39ª in Fig. 1, running to the driver's cab and terminating in a suitable manipulating device. The ignition and starting system for the engine (not shown) are preferably also more or less completely controlled from the cab and the exhaust is adapted to be disposed of from the exhaust pipes 40 through the car roof.

The power plant is of the "free engine" type inasmuch as the motor members of the power plant may rotate without communicating their movement to the driving wheels of the car or in the present case to the jack shaft 20. To this and other ends, a transmission mechanism is interposed between the engine shafts and the jack shaft, and this mechanism is designed: to alter the gear ratio between the engine shafts and the driving wheels; to reverse the direction of rotation of the driving wheels with respect to the engine; to disengage the engine functionally with respect to the driving wheels; and to provide a brake for the car wheels through their drive independent of the usual wheel brakes which are also provided.

Accordingly, in my preferred embodiment, each engine shaft delivers its power to a transmission mechanism individual thereto which is adapted to selectively engage its engine shaft with its transmission shaft 50 either through the planetary speed reduction gear 51 or through a direct driving friction clutch contained within the brake drum 53 and operated by a collar 54, and is also adapted to disengage these shafts. The transmission shafts, in turn, are each provided with a bevel pinion 55 rigidly mounted thereon and each constantly meshing with both of a pair of opposed bevel master gears 56 which are freely journaled on the jack shaft and are adapted to be selectively engaged with said jack shaft and disengaged therefrom by a positive clutch 57 rotatably immovable but axially slidable on the jack shaft whereby this clutch may engage with and disengage from co-operating opposed dogs one rigid with each of the master gears.

The jack shaft 20 which extends longitudinally of the car frame and lies in a horizontal plane slightly above that of the wheel axes, is journaled in the fore and aft ends of the transmission casing at 58 and is coupled at its ends adjacent the bearings 58 to the propeller shafts 21 and 22 by the universal joints 60 and 61 respectively. The propeller shafts 21 and 22 are in turn coupled to the axle driving shafts by the universal joints 62 and 63. These universal joints provide for the relative angular deflection and lateral disalinement of the jack shaft and the axle driving shafts 14 and are also intended to be more or less extensible to compensate for their relative axial movement. However separate means may be applied to the propeller shafts to render them sufficiently extensible and yet torsionally rigid.

Due to the low setting of the jack shaft, whereby the propeller shafts extend nearly horizontally when the car body is in a normal position; the length of the propeller shaft between flexing joints; and the location of these joints, especially the joints 62 and 63 which while disposed adjacent the pivotal axis of the truck are placed beyond this axis, that is on that side of the axis remote from or opposite to that where the companion joint 60 or 61 is located: the angle of flexure through which the joints are required to work as a result of the resilient movement of the car body and the pivotal movement of the truck, is minimized. In order to clear the low hanging propeller shafts 20 and 21 which pass over the inert axles 5, each of these axles is downwardly offset or "dropped" intermediate its ends, at 5ª as shown in Fig. 1.

Like the engine control, the controls of the transmission and emergency brakes are centralized and the paired units are preferably intended to be simultaneously operated. To this end the levers 70 for operating the speed reduction gear have their individual operating systems 71 connected together through an equalizer 72 to a common control 73 which engages the gear 51 by shifting the systems 71 longitudinally toward the head end of the car, that is, to the left as viewed in Fig. 1. Conversely the reduction gear is disengaged by the movement of this control system in the opposite direction. The direct driving friction clutches contained within the drums 53 have their operating levers 74 so inter-connected with the levers 70 that when the latter are operated in a direction to engage their gear, the friction clutch is disengaged and conversely when said gear lever is operated to disengage its gear the friction clutch is engaged. The levers 75 for operating the transmission brakes embracing the drums 53 are actuated by a pair of control systems 76 which are in turn connected through an equalizer 77 to a common brake control rod or link 78. Completing this control system, the lever 79 for shifting the positive clutch 57 to rotate the jack shaft in either direction or entirely disconnect it from the motor mechanism of the power plant is operated by an independent "reversing gear" system 80. Each of these three systems just described, namely the transmission or change speed gear control including the speed reducing gear and the direct driving clutch; the emergency brake control; and the "reversing gear" (and "neutral" gear) control: is carried to the driver's cab where they terminate in any suitable and conveniently located operating device.

In Fig. 3, wherein one end of the car with its wheel truck is shown in a double superposed view running on a straight track 9 and also on a track curve 9'; the operation of the driving gear for the traction wheels of the trucks, the trucks and the car body, individually and collectively: are believed to be clear by inspection in view of the foregoing disclosure. The car body, frame or other platform or load carrying structure embodying the side members F and F' and the end member F'' is shown in dotted lines in a position common for both sets of track rails. The truck and its drive, however, are shown in full lines indicating their position relatively to the body and the straight way, and in dotted lines indicating their position with relation to the body and each other when tracking on the curve.

What I claim is:—

1. The combination with a body carried by a pair of relatively spaced wheel trucks each having a live axle, and a king bolt connection between the trucks and the car body, of a power plant carried by the body between the trucks, a propeller shaft extending individually between the power plant and each of the trucks, said propeller shaft having a driving connection at one end with the power plant and at the other end with the live axle of its trucks, and a pair of flexible couplings interposed one between each of the propeller shafts and the driving axle connection, the latter couplings being disposed beyond the pivotal axes of the individual trucks.

2. In a railway car, the combination with a frame, a pair of wheel trucks each having an individual king bolt connection to the frame, and a power plant mounted on the frame between the trucks, of a traction shaft individual to each truck, a pair of propeller shafts each connecting one of the traction shafts to the power plant, flexible couplings interposed one between each of the propeller shafts and the power plant and one interposed between each of the propeller shafts, and its traction shaft at a point on the side of the king bolt axis remote from the power plant.

3. In a railway car, the combination with a frame comprising a pair of longitudinal side members and a pair of transverse bolsters spaced apart in the direction of length of the frame, of a truck centrally pivoted about a vertical king bolt axis to each of the bolsters, each of said trucks having a live axle disposed beyond the king bolt axis adjacent the remote ends of the car, a power plant suspended from the frame between said trucks and a pair of driving shafts extending one from each end of the power plant to each of said live axles, said drive shafts each being flexibly coupled at one end to the power plant and at its other end to its live axle at a point on the remote side of the king bolt axis with respect to the power plant.

4. In a railway car, the combination with a car frame having a transverse sub-frame hung thereunder intermediate its length, a flexible suspension for the sub-frame, and a power plant mounted on the sub-frame with its driving shaft extending longitudinally of the car frame, of a pair of wheel trucks each having a pair of transverse axles supporting the car frame at one of a pair of longitudinally spaced points disposed one on either side of the sub-frame, a king bolt connection between the car frame and each of the trucks, an axle drive on each of the relatively remote axles of the trucks, and a propeller shaft extending from each end of the driving shaft of the power plant to the corresponding axle drive.

5. In a railway car, the combination with a pair of wheel trucks each including a live axle provided with a bevel gear drive having a driving shaft, a frame supported on the trucks, and a king bolt connection between the trucks and the frame, of an engine mounted on the frame, a jack shaft extending longitudinally of the frame and having journal bearings supported thereon, means for connecting the engine shaft to and disengaging it from the jack shaft, and a propeller shaft individual to each truck flexibly connecting its driving shaft to the adjacent end of the jack shaft.

6. In a railway car, the combination with a car frame mounted on a wheel truck having an axle drive for its traction wheels, of a twin engine mounted on the car frame and including a pair of independent parallel engine shafts extending transversely of the car frame, a jack shaft journaled in bearings supported on the car frame and extending longitudinally thereof, a clutch and variable speed transmission mechanism including a reversing gear interposed between each of the engine shafts and the jack shaft, and means for communicating the movement of the jack shaft to the axle drive.

7. In a railway car wherein a car frame is supported by trucks, each including an axle adapted to be driven;—a power plant under the car frame between the supporting trucks adapted for driving the truck axles, said power plant including a pair of internal combustion engines, a transmission mechanism supported between said engines permitting of said engines operating in synchronism, and means for transmitting power from said transmission mechanism to the drive truck axles.

8. A railway car as called for in claim 7, wherein the power plant includes radiators at the outer sides of the engines with blowers between said radiators.

9. A power plant for a railway car, comprising opposed internal combustion engines at each side of the car, a transmission housing connecting the pairs of engines, a variable speed transmission mechanism in said housing, a brake mechanism in said housing, a clutch mechanism in said housing, and controlling means for all of said mechanisms.

10. In a railway car, the combination with a car frame and a motor mechanism mounted thereon, of a truck pivotally and resiliently attached to said car frame, said truck embodying an inner drop offset axle on the side of its pivot adjacent the motor mechanism and a driving axle on that side of said pivotal axis remote from the motor mechanism, a bevel gear drive for the driving axle embodying a driving shaft extending from the motor mechanism over the inner axle of the truck, beyond the pivotal axis of the latter and to the driving spindle of the driving axle thereof.

11. In a railway car, the combination with a car frame and a motor mounted thereon, of a truck embodying a suspension frame upon which the car frame is pivotally mounted, a driving axle, a bevel gear drive for said driving axle, a casing mounted coaxially on said axle and supporting the driving member of said drive, and a spring suspension interposed between said suspension frame and said axle casing, said spring suspension being adapted to support the load imposed upon the suspension frame and to resist the torque reactions set up by said casing.

12. In a railway car, the combination with a car frame and a motor mounted thereon, of a wheel truck embodying a suspension frame pivotally attached to said car frame, a pair of axles, a pair of traction wheels on one of said axles and a spring suspension interposed between said suspension frame and said axles to resiliently apply the load imposed upon said suspension frame to said axles and to communicate the driving reaction applied by said traction wheels to said suspension frame.

13. In a railway car, the combination with a pair of trucks including an axle drive and a body mounted on said trucks with a king bolt connection, of a power plant mounted upon said body and connected to said drive, said power plant including a pair of independent engines, a jack shaft, a pair of transmission shafts, one individual to each engine, a transmission mechanism interposed between each transmission shaft and its engine, a reversing gear common to both transmission shafts and interposed between said shafts and the jack shaft, and centralized means for simultaneously operating and controlling the pair of engines and transmission mechanisms and for independently operating the reversing gear.

14. In a railway car, the combination with a car body and a pivoted wheel truck provided with a traction wheel drive, of an internal combustion engine having a rotatable shaft, a mechanical transmission interposed between the engine shaft and the drive, said mechanism being adapted to positively connect and disconnect said engine shaft from said drive, a resilient support for the engine and means for cushioning the driving and tractive effort of the traction wheels.

15. The combination of a car having a truck including an axle adapted to be driven, a pair of opposed internal combustion engines at each side of the car, a transmission housing connecting the pairs of engines, means in said housing articulating said engines and the truck axle so that said engines may drive the truck axle, and controlling means for the last mentioned means.

In testimony whereof I affix my signature in presence of two witnesses.

HENRY FORD

Witnesses:
E. G. SIEBOLD,
J. EMMET HALL.